US009544274B2

(12) United States Patent
Deasy et al.

(10) Patent No.: US 9,544,274 B2
(45) Date of Patent: Jan. 10, 2017

(54) USER INTERFACE FOR CONTROLLING USE OF A BUSINESS ENVIRONMENT ON A MOBILE DEVICE

(71) Applicant: VMware, Inc., Palo Alto, CA (US)

(72) Inventors: Stephen Deasy, Brighton, MA (US); David Furodet, Pontcharra (FR); Robert Meyer, Harvard, MA (US); Craig Newell, Cambridge, MA (US); Claire Reynaud, Martigny (CH); Fanny Strudel, Brignoud (FR); Paul Wisner, Arlington, MA (US); Emil Sit, Cambridge, MA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 14/582,705

(22) Filed: Dec. 24, 2014

(65) Prior Publication Data

US 2015/0119113 A1    Apr. 30, 2015

Related U.S. Application Data

(63) Continuation of application No. 13/678,996, filed on Nov. 16, 2012, now Pat. No. 8,954,050.
(Continued)

(51) Int. Cl.
*H04M 3/00* (2006.01)
*H04L 29/06* (2006.01)
(Continued)

(52) U.S. Cl.
CPC .......... *H04L 63/0272* (2013.01); *B32B 37/16* (2013.01); *C09J 7/041* (2013.01); *G06F 3/0482* (2013.01);
(Continued)

(58) Field of Classification Search
CPC ...... H04W 12/06; H04W 12/08; H04W 4/001; H04W 76/02; H04W 4/003; H04W 4/00; H04M 1/72522; H04M 1/72583; H04L 63/0272; H04L 67/02; H04L 43/045; G06F 9/45558; G06F 9/455; G06F 9/445; G06F 2009/45595; G06F 3/0482; G06F 2009/45587; G06F 9/5077; G06F 9/5027; G06F 9/5011
(Continued)

(56) References Cited

U.S. PATENT DOCUMENTS 7,188,243 B2    3/2007  Shell et al.
7,424,710 B1    9/2008  Nelson et al.
(Continued)

FOREIGN PATENT DOCUMENTS

WO    2007149671 A2    12/2007
WO    2009147631 A1    12/2009

OTHER PUBLICATIONS

International Search Report, PCT/US2012/065899, Apr. 9, 2013.
(Continued)

*Primary Examiner* — Olumide T Ajibade Akonai
(74) *Attorney, Agent, or Firm* — Thomas | Horstemeyer, LLP

(57) ABSTRACT

A graphical user interface to provision business environments on mobile devices presents a navigation panel that displays a virtual phone template menu item and a policy setting menu item. Upon selection of the virtual phone template menu item, a template user interface is presented that enables an administrator to customize virtual phone image templates for users to be delivered to mobile devices that are configured to run the virtual phone image templates as virtual machines on the mobile devices in order to provide
(Continued)

a business environment. Upon selection of the policy setting menu item, a policy user interface is presented that enables the administrator to set security policies, wherein each of the security policies specifies a time interval within which a mobile device running a virtual machine corresponding to one of the virtual phone image templates should communicate with an enterprise server to comply with the security policy.

20 Claims, 10 Drawing Sheets

Related U.S. Application Data

(60) Provisional application No. 61/562,979, filed on Nov. 22, 2011.

(51) Int. Cl.

| | | |
|---|---|---|
| *C09J 7/04* | (2006.01) | |
| *B32B 37/16* | (2006.01) | |
| *H04W 12/06* | (2009.01) | |
| *H04W 12/08* | (2009.01) | |
| *H04W 4/00* | (2009.01) | |
| *G06F 9/445* | (2006.01) | |
| *G06F 9/455* | (2006.01) | |
| *G06F 3/0482* | (2013.01) | |
| *G06F 3/0484* | (2013.01) | |
| *H04M 1/725* | (2006.01) | |
| *H04W 76/02* | (2009.01) | |
| *H04L 12/24* | (2006.01) | |
| *H04W 68/12* | (2009.01) | |

(52) U.S. Cl.
CPC .......... *G06F 3/04842* (2013.01); *G06F 9/445* (2013.01); *G06F 9/455* (2013.01); *G06F 9/45558* (2013.01); *H04L 41/0853* (2013.01); *H04L 63/102* (2013.01); *H04L 63/105* (2013.01); *H04L 63/20* (2013.01); *H04M 1/72522* (2013.01); *H04M 1/72583* (2013.01); *H04W 4/001* (2013.01); *H04W 4/003* (2013.01); *H04W 12/06* (2013.01); *H04W 12/08* (2013.01); *H04W 68/12* (2013.01); *H04W 76/02* (2013.01); *G06F 2009/45587* (2013.01); *G06F 2009/45595* (2013.01); *Y10T 428/14* (2015.01)

(58) Field of Classification Search
USPC ............. 455/410, 411, 418, 419, 566; 726/3
See application file for complete search history.

(56) References Cited

U.S. PATENT DOCUMENTS

| | | |
|---|---|---|
| 7,941,510 B1 | 5/2011 | Tormasov et al. |
| 8,233,882 B2 | 7/2012 | Rogel |
| 8,528,059 B1 | 9/2013 | Labana et al. |
| 8,539,556 B1 | 9/2013 | Brandwine |
| 8,667,306 B2 | 3/2014 | Brown et al. |
| 2003/0065676 A1 | 4/2003 | Gbadegesin et al. |
| 2006/0003770 A1* | 1/2006 | Park .................. H04L 29/06027 455/445 |
| 2006/0080392 A1 | 4/2006 | Kawakami et al. |
| 2006/0182104 A1 | 8/2006 | Lee et al. |
| 2006/0224742 A1 | 10/2006 | Shahbazi |
| 2007/0198656 A1 | 8/2007 | Mazzaferri et al. |
| 2007/0298767 A1 | 12/2007 | Brown et al. |
| 2008/0070495 A1 | 3/2008 | Stricklen et al. |
| 2008/0125102 A1 | 5/2008 | Abel et al. |
| 2008/0201479 A1 | 8/2008 | Husain et al. |
| 2009/0113110 A1 | 4/2009 | Chen et al. |
| 2009/0132813 A1 | 5/2009 | Schibuk |
| 2009/0164994 A1 | 6/2009 | Vasilevsky et al. |
| 2009/0307705 A1 | 12/2009 | Bogner |
| 2010/0132015 A1 | 5/2010 | Lee et al. |
| 2010/0146504 A1* | 6/2010 | Tang .................. G06F 9/45537 718/1 |
| 2010/0161922 A1* | 6/2010 | Sharp .................. G06F 9/45558 711/162 |
| 2010/0223610 A1 | 9/2010 | Dehaan et al. |
| 2010/0235881 A1 | 9/2010 | Liu et al. |
| 2010/0279675 A1 | 11/2010 | Slack et al. |
| 2010/0330961 A1 | 12/2010 | Rogel |
| 2010/0333189 A1 | 12/2010 | Droux et al. |
| 2011/0107406 A1 | 5/2011 | Frost et al. |
| 2011/0154431 A1 | 6/2011 | Walsh |
| 2011/0209064 A1 | 8/2011 | Jorgensen et al. |
| 2011/0209196 A1 | 8/2011 | Kennedy |
| 2011/0225417 A1 | 9/2011 | Maharajh et al. |
| 2012/0246641 A1 | 9/2012 | Gehrmann |
| 2012/0284712 A1 | 11/2012 | Nimmagadda et al. |
| 2012/0289217 A1 | 11/2012 | Riemer et al. |
| 2013/0023235 A1 | 1/2013 | Fan et al. |
| 2013/0035063 A1 | 2/2013 | Fisk et al. |
| 2013/0042234 A1 | 2/2013 | DeLuca et al. |
| 2013/0042295 A1 | 2/2013 | Kelly et al. |
| 2013/0080769 A1 | 3/2013 | Cha et al. |
| 2013/0125113 A1* | 5/2013 | Do ......................... G06F 9/455 718/1 |
| 2013/0143522 A1 | 6/2013 | Rege et al. |
| 2013/0145448 A1 | 6/2013 | Newell |
| 2013/0217378 A1 | 8/2013 | Danford et al. |
| 2014/0007222 A1 | 1/2014 | Qureshi et al. |
| 2014/0201743 A1 | 7/2014 | Ali et al. |

OTHER PUBLICATIONS

Office Action mailed Feb. 29, 2016 for U.S. Appl. No. 14/929,027.
Office Action mailed Jul. 14, 2016 for U.S. Appl. No. 14/929,027.
Office Action mailed Sep. 23, 2016 for U.S. Appl. No. 14/994,383.

* cited by examiner

Work Mobile Device Manager | Welcome | Help | Logout | 🔍

- Dashboard
- Users
- ▸ Groups
- ▸ Policy Sets
- ▸ Templates
- Work Phone Images
- Applications
- Configuration Search Results (0)

| Work Phone Users | Corporate Directory |

Status [All ▾]

| | Name | Username | Group | Status |
|---|---|---|---|---|
| ☐ | User A | usernameA | Sales | Active |
| | User B | usernameB | Sales | Active |
| | User C | usernameC | Marketing | Inactive |
| | User D | usernameD | Engineering | Pending Install |
| | User E | usernameE | Sales | Wiped |
| | User F | usernameF | Legal | Active |
| | User G | usernameG | Finance | Inactive |
| | User H | usernameH | Sales | Active |
| | User I | usernameI | Sales | Active |
| | User J | usernameJ | Engineering | Active |
| | User K | usernameK | Engineering | Active |
| | User L | usernameL | Finance | Activated |
| | User M | usernameM | Executive | Activated |
| | User N | usernameN | Legal | Locked |
| | User O | usernameO | Finance | Inactive |
| | User P | usernameP | Marketing | Active |
| | User Q | usernameQ | Sales | Active |
| | User R | usernameR | Sales | Active |

▸ Recently Viewed
▸ Activation Licenses

FIG. 3B

Work Mobile Device Manager

| Welcome | Help | Logout | 🔍

- Recently Viewed
- Activation Licenses

Dashboard

Users

▼ Groups
- Sales
- Marketing
- Engineering

🛠 Create New Group

▲ Groups
▲ Templates

Work Phone Images

Applications

Configuration

Sales Group

✏ Edit   📋 Clone   ✖ Delete     View Change History

▼ General

| Name | Sales |
|---|---|
| Description | Mobile device users in the Sales Department |
| Policy Set | Default Policies Set |
| Template | Default Virtual Phone Template |

▼ Group Users

| ☐ Name | Username | Group | Status |
|---|---|---|---|
| User A | usernameA | Sales | Active |
| User B | usernameB | Sales | Active |
| User H | usernameH | Sales | Active |
| User I | usernameI | Sales | Active |
| User Q | usernameQ | Sales | Active |
| User R | usernameR | Sales | Active |
| User T | usernameT | Sales | Active |
| User V | usernameV | Sales | Inactive |
| User AA | usernameAA | Sales | Active |
| User FF | usernameJJ | Sales | Locked |
| User JJ | usernameJJ | Sales | Pending Install |

FIG. 3C

USER INTERFACE FOR CONTROLLING USE OF A BUSINESS ENVIRONMENT ON A MOBILE DEVICE

CROSS REFERENCE TO RELATED APPLICATIONS

This application is a continuation of U.S. patent application Ser. No. 13/678,996, filed on Nov. 16, 2012, and entitled "User Interface for Controlling Use of a Business Environment on a Mobile Device", which claims the benefit of U.S. Provisional Patent Application 61/562,979, filed on Nov. 22, 2011, and entitled "Provisioning Work Environments on Personal Mobile Devices", which are both hereby incorporated by reference. U.S. application Ser. No. 13/678,996 is also related to U.S. patent application Ser. No. 13/678,964, filed on Nov. 16, 2012, and entitled "Provisioning Work Environments on Personal Mobile Devices" and U.S. patent application Ser. No. 13/678,976, filed on Nov. 16, 2012, and entitled "Controlling Use of a Business Environment on a Mobile Device", all of which are assigned to the assignee of this application.

BACKGROUND

Over the past decade, enterprises have experienced a substantial increase in the productivity of its workforce when providing them with business mobile devices. In the past, given their high cost, business mobile devices were mainly allocated to management and focused on providing employees with email access and cellular phone capabilities. However, recent improvements in the computing power, mobile display technologies and connection speeds of mobile devices, combined with the continued decreases in hardware costs, have made powerful mobile devices available even to the general public for personal use. More and more individuals personally own powerful mobile devices, such as smartphones, that, in addition to serving as a cellular phone, can be used in many of the same ways as a desktop or a laptop, such as accessing emails, browsing documents or the internet, game playing, listening to audio or viewing a video, and personal information management (PIM).

Due to the above trends in mobile devices, enterprises are currently experiencing an "invasion" of personal devices into the workplace. Given the sophisticated capabilities of their personal mobile devices, employees no longer desire possessing a separate personal and business mobile device and continually pressure information technology (IT) departments to support personal devices brought into the workplace. As such, IT departments struggle to maintain a proper balance between enabling a certain level of access to enterprise data (e.g., such as access to email, contacts, documents, and the like) on personal devices and ensuring adequate security measures to protect corporate intellectual property in such enterprise data. This phenomenon has led enterprises to investigate the viability of a "Bring Your Own Device" (BYOD) strategy to IT, where a personal mobile device is provisioned by IT departments with the capability of operating as a complete business mobile device in a secure fashion.

Such a BYOD strategy could significantly decrease IT costs (e.g., by eliminating or reducing the need to purchase and provision hardware devices) and provide mobile enterprise access to many more employees than was previously possible (e.g., due to cost concerns), thereby achieving greater increases in productivity than before. However, significant challenges arise in provisioning "work environment" on a personal mobile device that maintains adequate security and data partitioning between the employee's "personal world" and the employer's "business world."

SUMMARY

One or more embodiments of the invention provide virtualization as the solution for consolidating personal and business uses in a single mobile device. One feature of virtualization is that it preserves isolation of the personal and work environments. As a result, the user need not provide enterprise IT departments any control of the user's personal environment and the enterprise IT departments can retain strict control of the user's work environment. Another feature of virtualization is that the user's work environment will be platform independent. In other words, regardless of the type of personal mobile device the user chooses, the resulting business mobile device through virtualization will be identical. Therefore, enterprise IT departments need to support only one type of business mobile device.

One method for providing a graphical user interface to provision business environments on mobile devices, according to one or more embodiments of the invention, comprises presenting a navigation panel that displays a virtual phone template menu item and a policy setting menu item. Upon selection of the virtual phone template menu item, a template user interface is presented in a display panel that enables an administrator to customize virtual phone image templates for users in an enterprise to be delivered to mobile devices that are configured to run the virtual phone image templates as virtual machines on the mobile devices in order to provide a business environment. Upon selection of the policy setting menu item by the administrator, a policy user interface is presented in the display panel that enables the administrator to set security policies corresponding to the virtual phone image templates, wherein each of the security policies specifies a time interval within which a mobile device running a virtual machine corresponding to one of the virtual phone image templates should communicate with an enterprise server to comply with the security policy.

BRIEF DESCRIPTION OF THE DRAWINGS

FIGS. 3A-3E depict embodiments of an administrator user interface of a administration service for provisioning a business mobile device on a personal mobile device.

DETAILED DESCRIPTION

Figure 1:
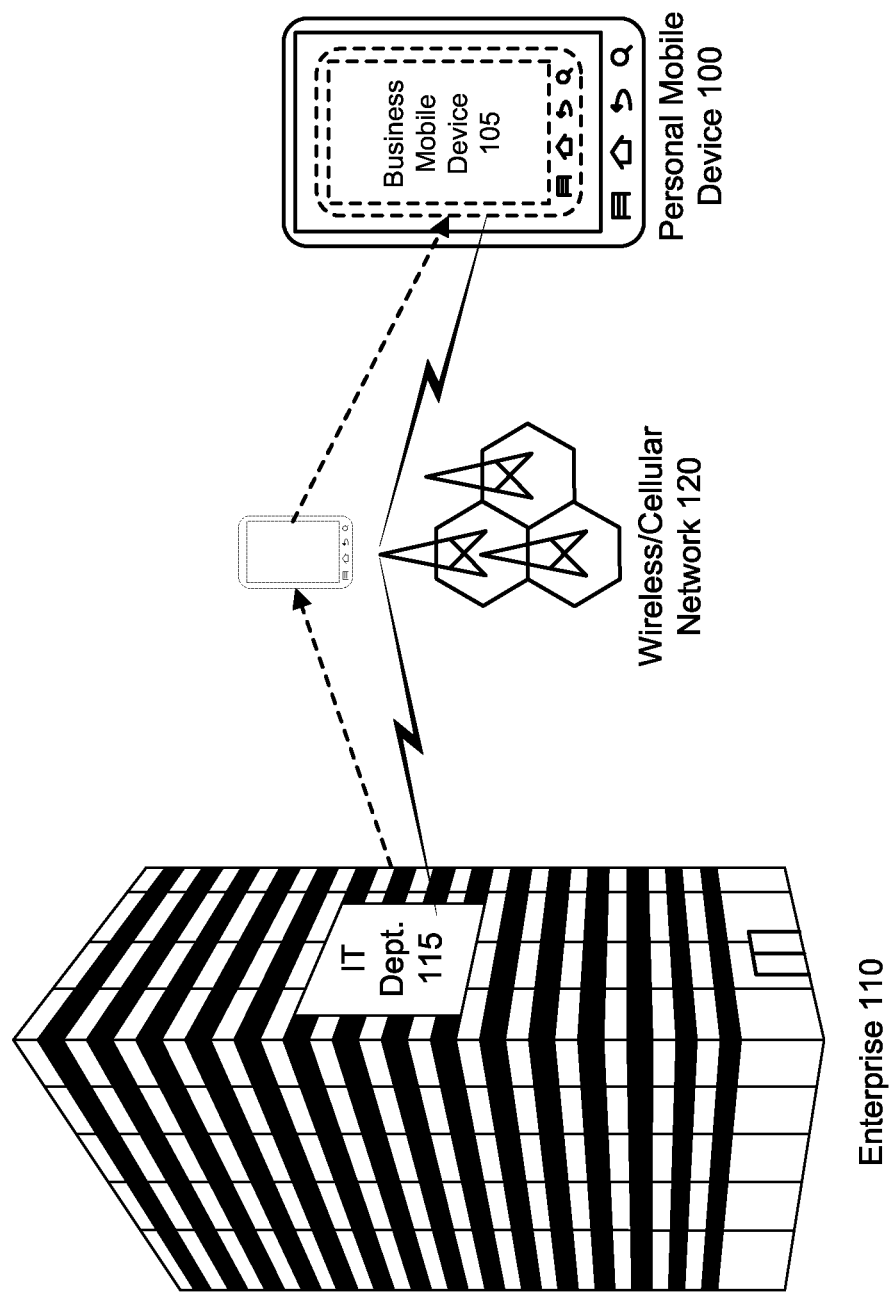
FIG. 1 is an illustration of an example use case in which embodiments may be practiced.

FIG. 1 is an illustration of an example use case in which embodiments may be practiced. As depicted, an IT department 115 of an enterprise 110 may provide the capability to "provision" a software-based business mobile device 105 that runs on an employee's personal mobile device 100. Such provisioning (e.g., delivery of business mobile device 105 to personal mobile device 100) may be performed "over-the-air" through a wireless network (e.g., WiFi network, etc.), cellular network 120 or combination thereof. In certain embodiments, as described herein, such a software-based business mobile device 105 takes the form of a virtual machine that runs on top of a software virtualization layer (also sometimes referred to herein as a hypervisor) supported by the "host" operating system (e.g., Android™, iOS™, Symbian™ webOS™, etc.) of personal mobile device 100 (such virtual machine sometimes also referred to herein as a "virtual phone").

Figure 2:
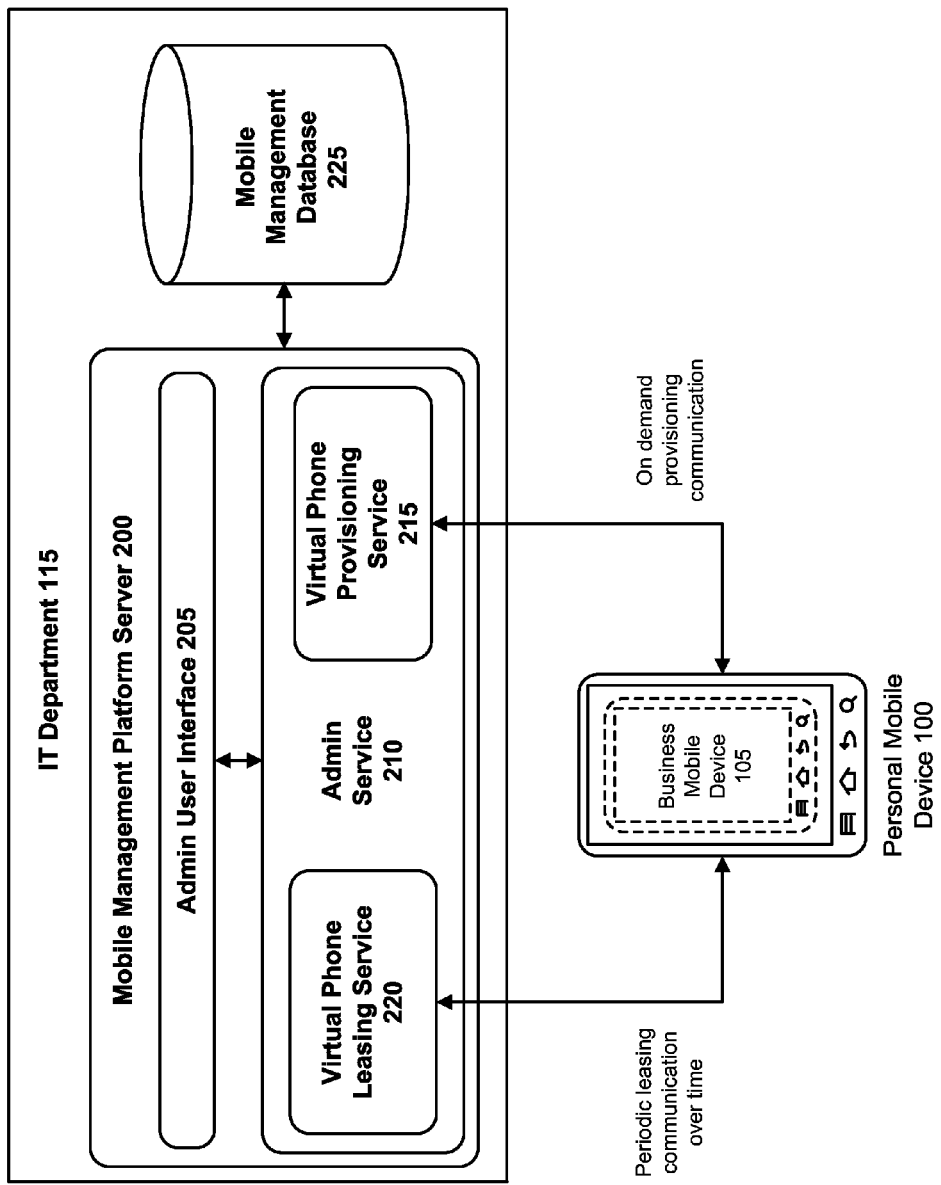
FIG. 2 depicts an embodiment of a mobile management platform that may be utilized by an IT department to provision a business mobile device on a personal mobile device 100.

FIG. 2 depicts an embodiment of a mobile management platform that may be utilized by IT department 115 to provision a business mobile device on personal mobile device 100. As depicted, a mobile management platform server 200 (e.g., software-based) is installed on a computer system of IT department 115 and provides a number of functional components. Through human interface devices (e.g. mouse, keyboard, touchscreen, etc.), an administrator can interact with an admin user interface 205 to access an admin service component 210, which, as further discussed below, offers a variety of services to assist the administrator in provisioning a business mobile device 105 on a personal mobile device 100. As depicted in the embodiment of FIG. 2, admin service component 210 may further include a virtual phone provisioning service component 215 that establishes a connection (e.g., wireless) with personal mobile device 100 in order to deliver a virtual phone image for business mobile device 105 to personal mobile device 100 and a virtual phone leasing service component 220 that periodically communicates (e.g., wirelessly) over time with personal mobile device 100 (e.g., once business mobile device 105 has been installed on personal mobile device 100), for example, in order to ensure compliance with certain security policies regarding the user's ability to access an installed business mobile device 105 or to provide updates to the virtual phone image of business mobile device 105. Admin service component 210 accesses a mobile management database 225 in order to manage and store, for example, user profiles, group profiles (e.g., business groups of an enterprise, such as sales, marketing, legal, finance, engineering, etc.), business mobile device policies (as further described below), virtual phone images for business mobile devices, mobile applications that may be included in virtual phone images, etc. In one embodiment, mobile management database 225 may comprise a relational database to store user profiles, groups profiles and business mobile device policies as well as a file system based repository to store various virtual phone images and mobile applications.

Figure 3A:
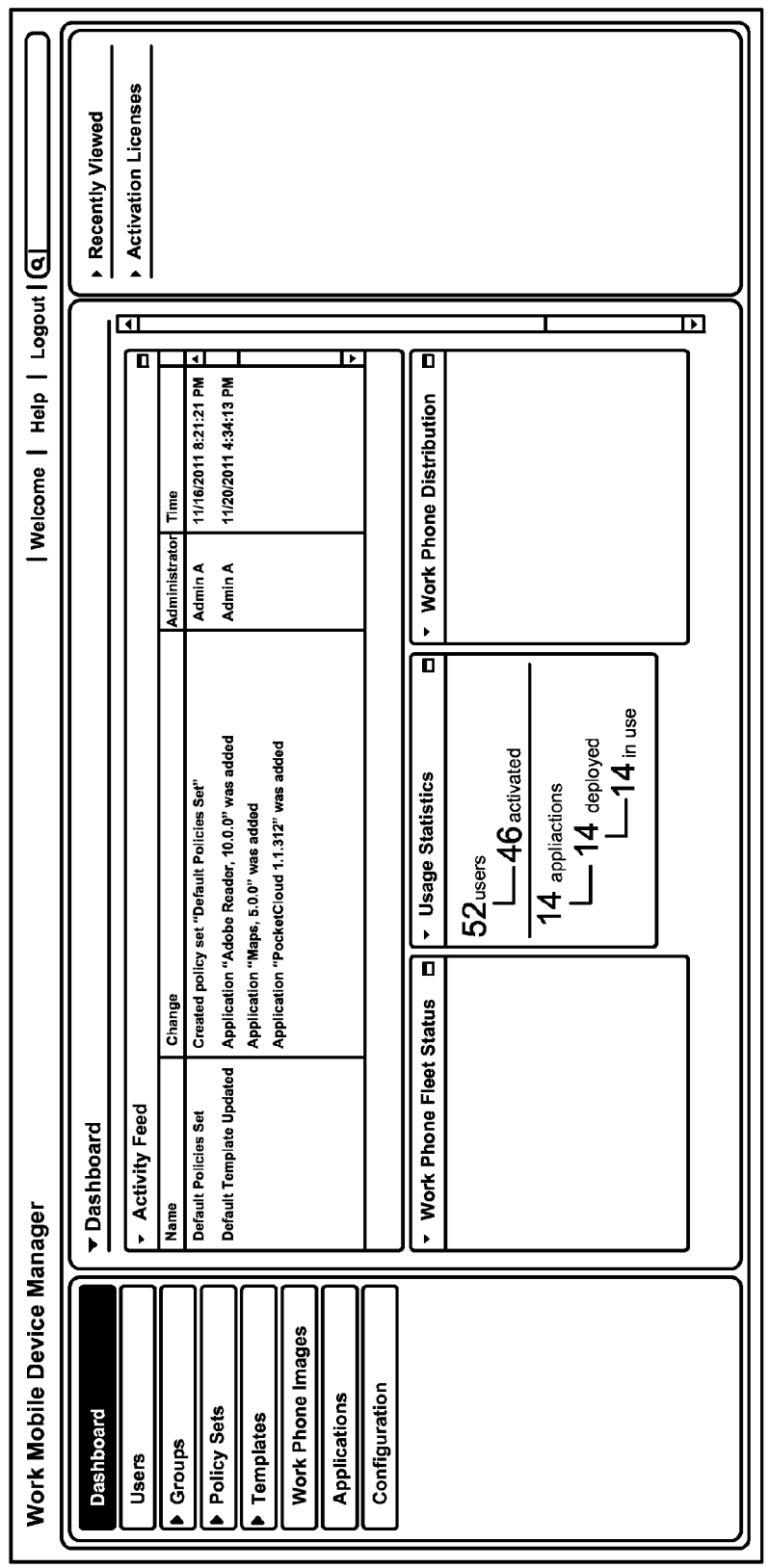

FIGS. 3A-3E depict embodiments of an admin user interface 205 of an admin service 210. In one embodiment, admin user interface 205 and admin service 210 are implemented as a web application accessible through a web browser although alternative embodiments may be implemented differently, including, for example, as a standalone client-side application. FIG. 3A illustrates an embodiment of an initial "dashboard" view that is displayed, for example, when an administrator initially logs into admin service 210 through admin user interface 205. The left side of FIG. 3A provides a navigation panel enabling an administrator to manage and view various settings relating to users that have been provisioned with business mobile devices, business group configurations for business mobile devices, policy settings for business mobile devices, various virtual phone images for business mobile devices, mobile applications that can be provisioned to business mobile devices and other configuration information. As illustrated, the dashboard's main view provides an overview of recent administration activities (e.g. "activity feed") and other usage statistics. FIG. 3B illustrates a user view displaying information relating to users who have been provisioned a business mobile device by mobile management server 200. As FIG. 3B depicts, users may be organized into a variety of business groups or organizations within enterprise 110, such as sales, marketing, finance, legal, engineering and the like. As further described below, in certain embodiments, such business groups are able to set their own default policies and default virtual phone images for users in their groups. The user view of FIG. 3B also indicates a status of the business mobile device 105 provisioned by admin service 210 to each user. Such status of a user's business mobile device may be, for example, active, inactive, locked, wiped, pending installation, and the like. In certain embodiments of this user view and as further described below, an administrator is able to request that mobile management platform 200 (e.g., via virtual phone leasing component 215, etc.) "wipe" a particular user's business mobile device 105 from the personal mobile device 100 (e.g., delete the virtual phone image or otherwise remove the functionality of business mobile device 105), for example, when such user has left enterprise 110 and is no longer an employee. It should be recognized that such a wiping of business mobile device 105 does not affect the user's ability to use personal mobile device 100. FIG. 3C illustrates a group view displaying information relating to business mobile devices configured for a particular business group within enterprise 110, such as the sales group. As depicted, the group view of FIG. 3C displays a business mobile device policy that has been set for the sales group (i.e., the "default policies set") as well as a virtual phone image that has been set for the sales group (i.e., the "default virtual phone template"). The group view of FIG. 3C further displays users belonging to the sales group who have been provisioned a business mobile device as well as enables the administrator to create, store and modify new and existing groups.

Figure 3D:
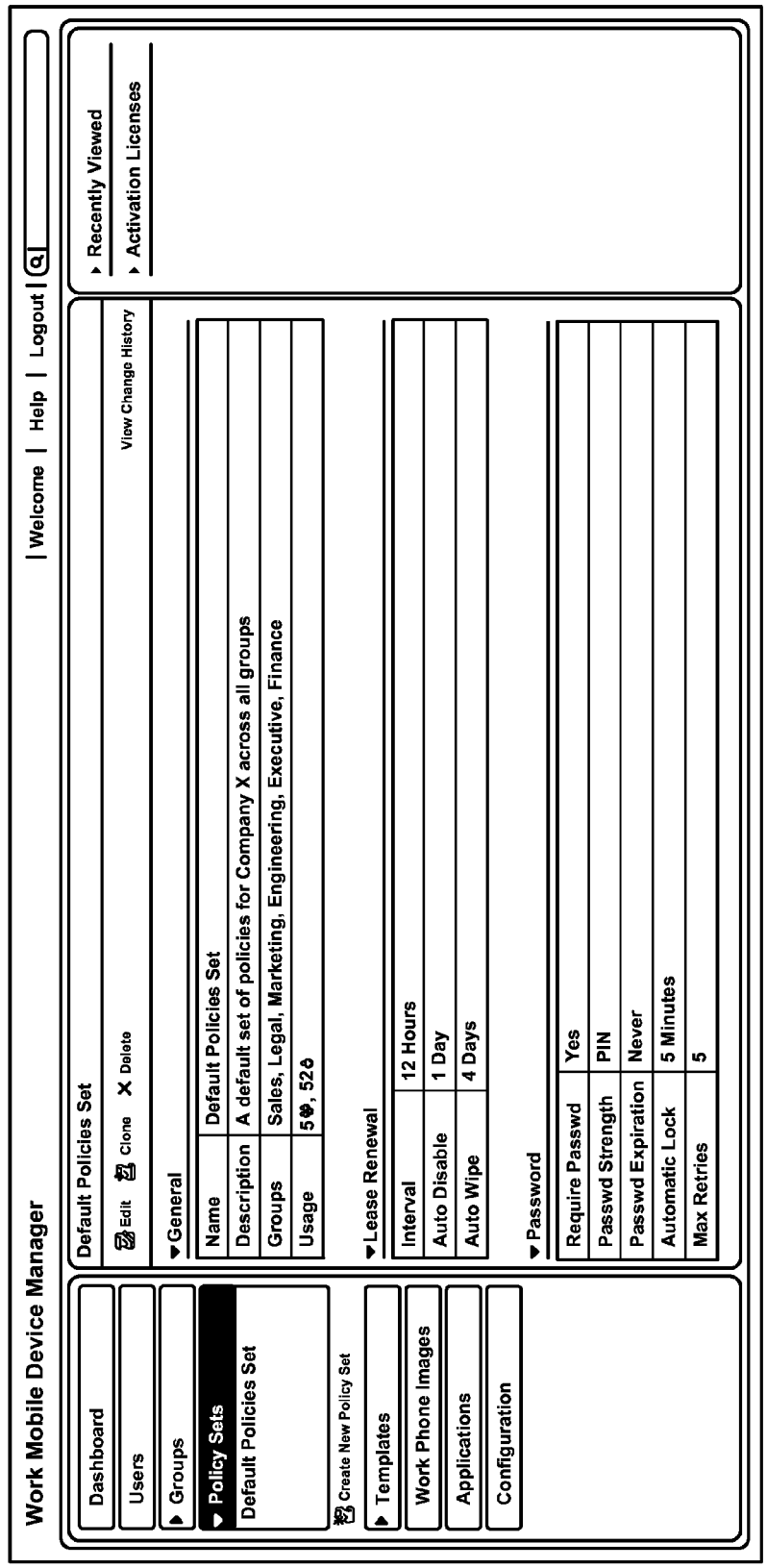

FIG. 3D illustrates an embodiment of a policy setting view of admin user interface 210. As depicted, the policy setting view of FIG. 3D enables an administrator to view, create, store and modify different policies for managing business mobile devices. Such policies, for example and as illustrated in FIG. 3D, may include "lease" renewal settings including an "interval" setting defining how often virtual phone leasing service 220 and personal mobile device 100 attempt to establish communications, an "auto disable" time period setting, expiration (e.g., time period expires without an intervening interval communication with virtual phone leasing service 220) of which may trigger personal mobile device 100 to temporarily disable business mobile device 105 (e.g., putting business mobile device 105 into a "locked" state that prevents a user from utilizing business mobile device 105 until a successful communication by personal mobile device 110 with virtual phone leasing service 220), an "auto wipe" time period setting, expiration (e.g., time period expires without an intervening interval communication with virtual phone leasing service 220) of which may trigger personal mobile device to permanently "wipe," deactivate or otherwise remove business mobile device 105 from personal mobile device 100, etc. Other security related policy settings may also be configured in the policy setting view of FIG. 3D including, for example, whether a password is required to access business mobile device 105, the type and strength of the password (PIN, etc.), expiration periods for passwords, length of inactivity time before business mobile device 105 presents a lock screen, amount of retries before business mobile device 105 locks, etc. Other policy settings in embodiments may include whether business mobile device 105 may be accessible by VPN, whether a debugging mode can be set on business mobile device 105 to assist an administrator to troubleshoot issues, whether data can be cut and paste and shared between personal mobile device 100 and business mobile device 100, and the like.

Figure 3E:
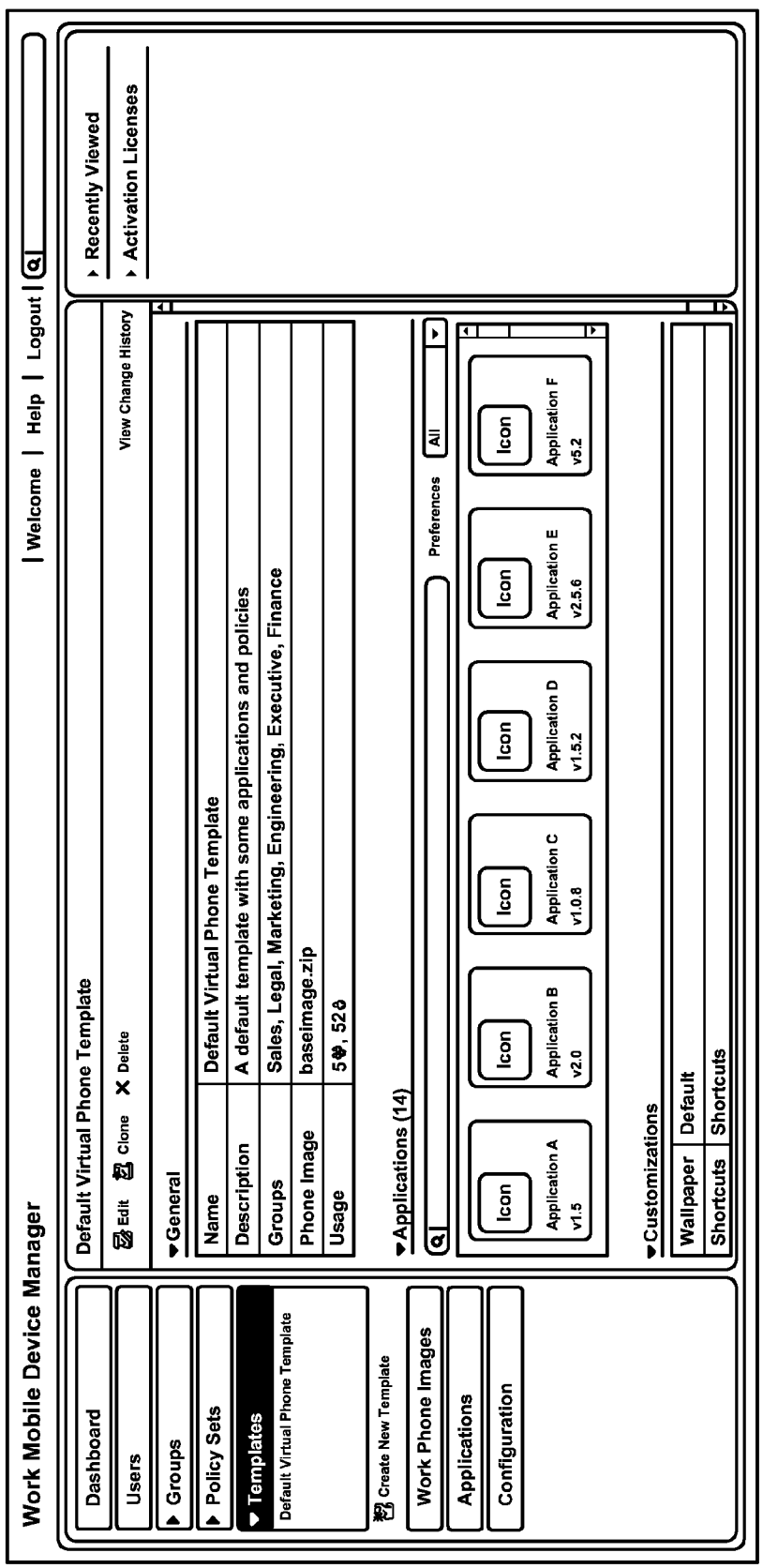

FIG. 3E illustrates an embodiment of a virtual phone image view of administrator user interface 210. Through this view, an administrator is able to view, create, store and modify base virtual phone images for business mobile devices (e.g., according to requirements of different business groups in enterprise 110) that can be delivered to personal mobile device 100. Such a base image or "template" may include a selected mobile "guest" operating system (e.g., Android, iOS, Symbian, webOS, etc.), selected default user settings or customizations for the mobile operations system (e.g., wallpaper, shortcuts, sounds, security settings, network settings, third part service synchronization settings, etc.), selected installed default mobile applications, and the like. FIG. 3A also illustrates additional views accessible from the left side navigation panel that an administrator may desire to select in order to manage business mobile device activity. For example, the "work phone images" button enables the administrator to view current virtual phone images that have been uploaded into mobile management database 225 as well as to upload new virtual phone images. Similarly, the "applications" button enables the administrator to view current mobile applications that have been uploaded into mobile management database 225 and may be added to an existing or new virtual phone template. Such an applications view may further enable the administrator to upload additional mobile applications from third party sources such as various third party application stores (e.g., Android Market, Apple App Store, Amazon Appstore, carrier applications stores, etc.). The "configuration" button may enable the administrator to view currently scheduled jobs that have been scheduled by the administrator (e.g., delivery of virtual phone images to personal mobile devices, updates to existing virtual phone images that have already been installed on personal mobile devices, requests to wipe virtual phone images from personal mobile devices, etc.), a list of administrators in IT department 115 and other configuration information.

It should be recognized that the views of FIGS. 3A-3E are merely exemplary and that alternative embodiments of admin user interface 205 and admin service 210 may implement different user interfaces with different design decisions that offer different management functions than those depicted in FIGS. 3A-3E. For example, embodiments of administration service 210 may further provide an administrator a capability to maintain a menu of "a la carte" mobile applications that can be separately provisioned to a particular user's business mobile device 105, for example, upon request of such user and separate from any default mobile applications that are included in virtual phone images.

Figure 4:
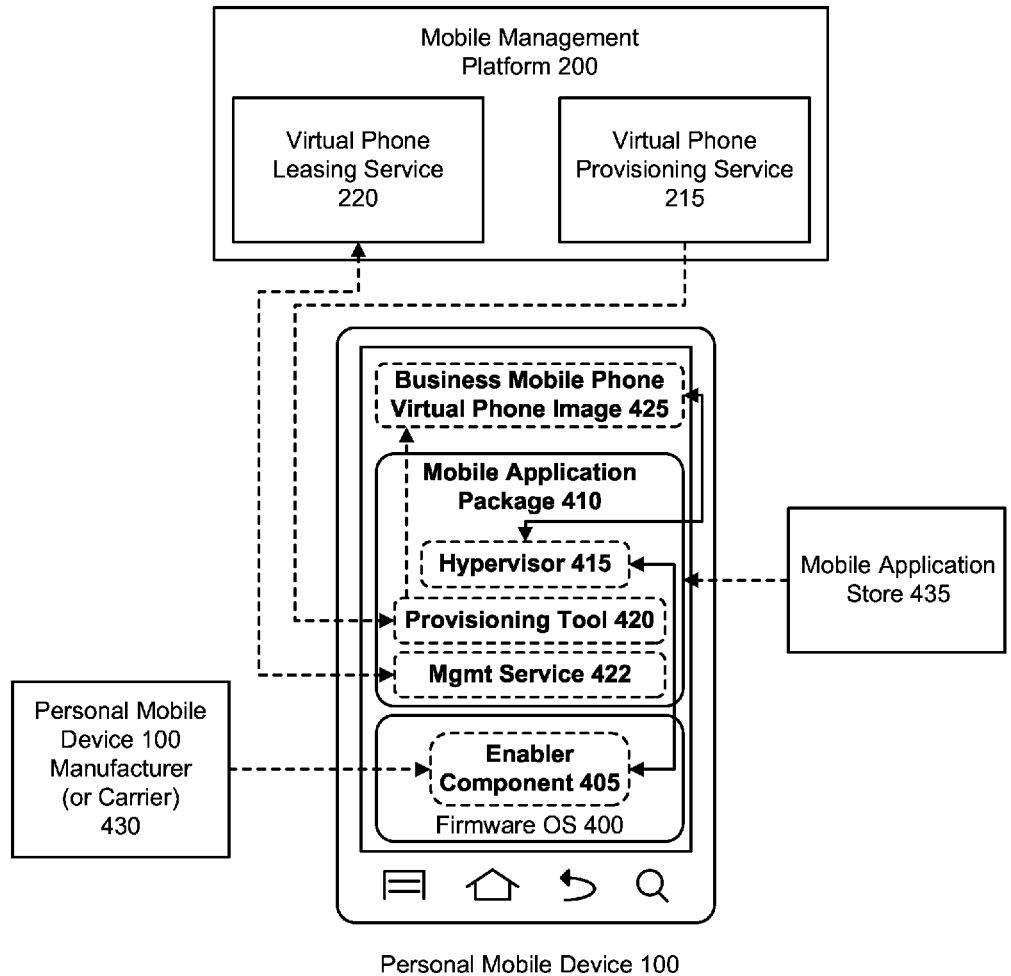
FIG. 4 depicts an internal system architecture of a personal mobile device that supports a business mobile device according to an embodiment.

FIG. 4 depicts an internal system architecture of personal mobile device 100 that supports a business mobile device according to an embodiment. Personal mobile device 100 includes a firmware operation system (OS) 400, such as Android, iOS, Symbian, webOS, etc. In the embodiment of FIG. 4, a virtual phone "enabler" component 405 is embedded into firmware OS 400. Because it is embedded into firmware OS 400, enabler component 405 is able to execute certain of its functions in privileged modes (e.g., superuser, root access, etc.) that are typically reserved for functions of firmware OS 400. For example, in one embodiment, upon a launch of business mobile device 105 by a user (e.g., by selecting a "work phone" icon displayed on personal mobile device 100, etc.), enabler component 405 loads a virtual phone image for business mobile device 105 into the memory of personal mobile device 100 and dedicates a thread for the execution of a virtual machine for business mobile device 105. During execution of the virtual machine for business mobile device 105, other portions of enabler component 405 may then generally support the transfer of control between firmware OS 400 and business mobile device 105 (sometimes referred to as "world switching"). In addition to the foregoing, in certain embodiments, portions of enabler component 405 may further assist with issues such as memory allocation, timers, power management, communications between a hypervisor 415 (as further discussed below) running on top of firmware OS 400 and a virtual hardware platform (sometimes referred to herein as a "virtual machine monitor") of the virtual machine for business mobile device 105, enabling networking capabilities (e.g., TCP/IP, IPv4/IPv6, etc.) for the virtual machine of business mobile device 105 and the like. In one embodiment, enabler component 405 is embedded into firmware OS 400 by a mobile device manufacturer or a carrier 430, such that a personal mobile device 100 purchased by a user (e.g. via generally available methods such as carrier stores, electronics stores, consumer goods stores, ecommerce web sites, etc.) already includes enabler component 405.

A personal mobile device 100 having firmware OS 400 that includes enabler component 405 is able support a mobile application package 410 that comprises a variety of functional components such as a hypervisor 415, a provisioning tool 420 and a management service 422. In one embodiment, a user may download mobile application package 410 from a mobile application store 435 such as the Android Market, Apple App Store, Amazon Appstore, etc. For example, such a mobile application package 410 may take the form of a .apk file if downloaded from the Android Market. Once downloaded and installed on the host OS of personal mobile device 100, mobile application package 410 authenticates and binds itself to enabler component 405, thereby enabling the various functional components of mobile application package to execute in higher privileged and/or secured modes. Hypervisor 415 is a virtualization layer running on top of firmware OS 400 which provides necessary services to enable execution of a virtual machine for business mobile device 105. In one embodiment, the guest OS included in a virtual phone image 425 for business mobile device 105 includes "paravirtualized" guest drivers for each device of personal mobile device 100 that enables a virtual hardware layer (or virtual machine monitor) of the virtual machine to intercept hypercalls for device specific behavior and forward such hypercall requests as needed to hypervisor 415, which in turn facilitates communication with the actual hardware devices of personal mobile device 10. It should be recognized that alternative embodiments may utilize a non-paravirtualized implementation where guest drivers and the guest OS of virtual phone image 425 may be unaware that they are running on top of a virtualization layer. As further depicted in FIG. 4, mobile application package 410 also includes a provisioning tool 420 that may, for example, provide a user interface and other support services to assist a user in retrieving virtual phone image 425 and other configuration information (e.g., policy configurations, additional mobile applications, etc.) from virtual phone provisioning service 215 of mobile management server 200 in IT department 115. Mobile application 410 further includes a management service 422 that once installed, continuously runs as a service on the host OS and periodically communicates with virtual phone leasing service, for example, in order to comply with various security policy settings for business mobile device 105 or to provide various updates (e.g., OS updates, customizations, new applications, etc.) to virtual phone image 425 of business mobile device 105. In one embodiment, because management service 422 is able to run in a higher privilege or security level due to its binding to enabler component 405, it cannot be manually terminated by the user of personal mobile device 100 (e.g., without such user obtaining root access, etc.).

Figure 5:
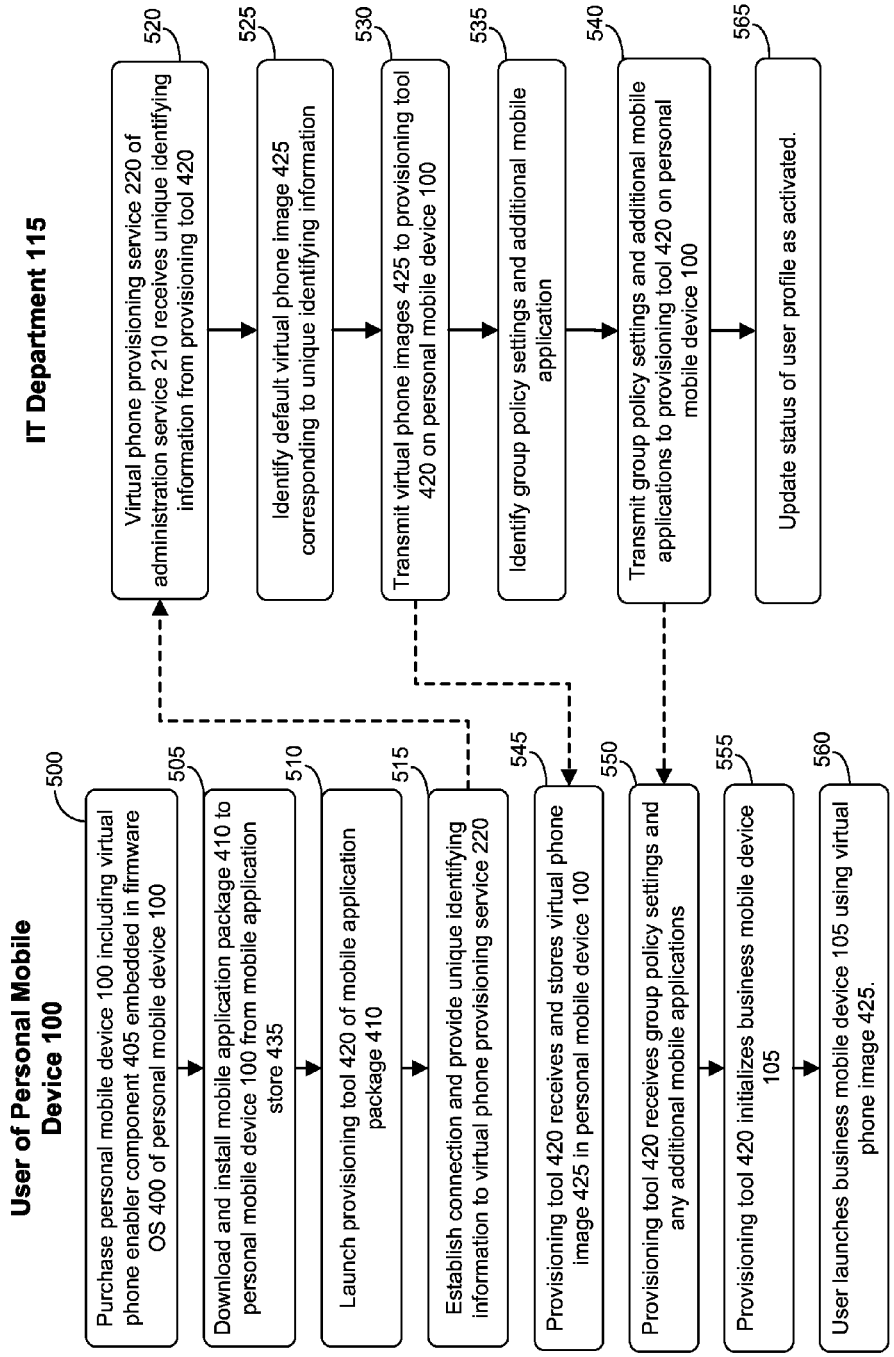
FIG. 5 is a flow that illustrates a process for provisioning a virtual phone image for a business mobile device on a personal mobile device.

FIG. 5 is a flow that illustrates a process for provisioning virtual phone image 425 for business mobile device 105 on personal mobile device 100. In step 500, a user purchases personal mobile device 100 including firmware OS 400 that includes enabler component 405. In step 505, the user, for example, using a mobile app store application already installed on personal mobile device 100 (or through alternative downloading means), purchases or otherwise downloads and installs mobile application package 410 on the host OS of personal mobile device 100. Upon installation of mobile application package 410, in step 510, the user launches provisioning tool 420 of mobile application package 410. In one embodiment, provisioning tool 420 provides a user interface to the user to input information into provisioning tool 420 that enables provisioning tool 420 to establish a connection (e.g., wireless) to virtual phone provisioning service 215. For example, an administrator of IT department may, via an out-of-band channel (e.g., orally, email, support ticket, etc.), provide the user a URL to input into provisioning tool 240 which identifies a network address (e.g., and listening port) of mobile management platform 200 and/or unique identifying information (e.g., user ID, etc.) that virtual phone provisioning service 215 can utilize to match a virtual phone image 425 that corresponds to the user. Alternatively, a user may alternatively provide such unique identifying information (e.g., enterprise username and password, etc.) to provisioning tool 420 or provisioning tool 420 may extract such a unique identifying information from personal mobile device 100 itself (e.g., user's cell phone number, etc.). Upon receipt of such unique identifying information from provisioning tool 420, virtual phone provisioning service 215 is able to identify a virtual phone image 425 that corresponds to the user. In an alternative embodiment, virtual phone provisioning service 215 may utilize push methodologies to transmit a push message to personal mobile device 100 that wakes-up provisioning tool 420 on personal mobile device 100 in order to establish a connection back to virtual phone provisioning service 215. In one such embodiment, such a push message may include unique identifying information corresponding to the user which provisioning tool 420 can transmit back to virtual phone provisioning service 215 to enable virtual phone provisioning service 215 to identify a virtual phone image 425 corresponding to the user (or alternatively, provisioning tool 420 can prompt the user for such unique identifying information, such as a username and password or extract such unique identifying information from personal mobile device 100, such as a cell phone number).

In step 515, provisioning tool 420, as described above, establishes a connection (e.g., wireless) with virtual phone provisioning service 215 and provides the unique identifying information to virtual phone provisioning service 215 to identify a virtual phone image 425 corresponding to the user. In step 520, virtual phone provisioning service 215 receives the unique identifying information and, in step 525, dynamically generates or otherwise identifies a previously stored default virtual phone image 425 corresponding to the unique identifying information (and thus, the user). For example, in one embodiment, virtual phone provisioning service 215 determines an identity of the user from the received unique identifying information and is able to identify a default virtual phone image 425 stored in a file system repository of mobile management database 225 that corresponds to the business group of the user (see, e.g., FIG. 3C). In step 530, virtual phone provisioning service 215 transmits virtual phone image 425 to provisioning tool 420. In one embodiment, such virtual phone image 425 is transmitted as a zip file. In step 535, virtual phone provisioning service 215 similarly identifies policy settings corresponding to the user's business group (see, e.g., FIG. 3D) as well as any additional mobile applications requested by the user (and supported by IT department 115) that are not included in virtual phone image 425, and in step 540, transmits the policy setting and additional mobile applications to provisioning tool 420. In one embodiment, communication between virtual phone provisioning service 215 and provisioning tool 420 during transmission of virtual phone image 425, business group policy settings, and additional mobile applications occurs through RESTful APIs (representational state transfer application programming interface). In steps 545 and 550, provisioning tool 420 receives virtual phone image 425, group policy settings and additional mobile applications, respectively. In one embodiment, provisioning tool 240 receives and stores virtual phone image 425, due to its size (e.g., 3 GBs or higher in some embodiments), on an external storage card of personal mobile device 100, such as an external microSD card or other similar small form factor mass storage devices. Alternative embodiments may store virtual phone image 425 in the internal memory (e.g., NAND flash memory or embedded eMMC/eSD memory chips) of personal mobile device 100. In step 555, provisioning tool 420 initializes business mobile device 105. For example, in one embodiment, during such initialization, provisioning tool 420 provides certain group policy settings received in step 550, such as lease settings, to management service 422 to initiate a periodic "leasing" communication with virtual phone leasing service 220 in accordance with the lease settings for the user's business group (see, e.g., FIG. 3D). Similarly, provisioning tool 420 may provide other group policy settings, such as password settings, to hypervisor 415 to enable hypervisor 415 to properly control password access to business mobile device 105. The initialization process may additionally install any additional mobile applications into virtual phone image 425. Once initialized, in step 560, the user may launch business mobile device 105 in a virtual machine supported by hypervisor 415 using virtual phone image 425. Similarly, once virtual phone image 425 has been delivered and installed on personal mobile device 100, at step 565, mobile management platform 200 may update a user profile corresponding to the user (see, e.g., FIG. 3B) to indicate that the user's business mobile device 105 has now been activated.

Figure 6:
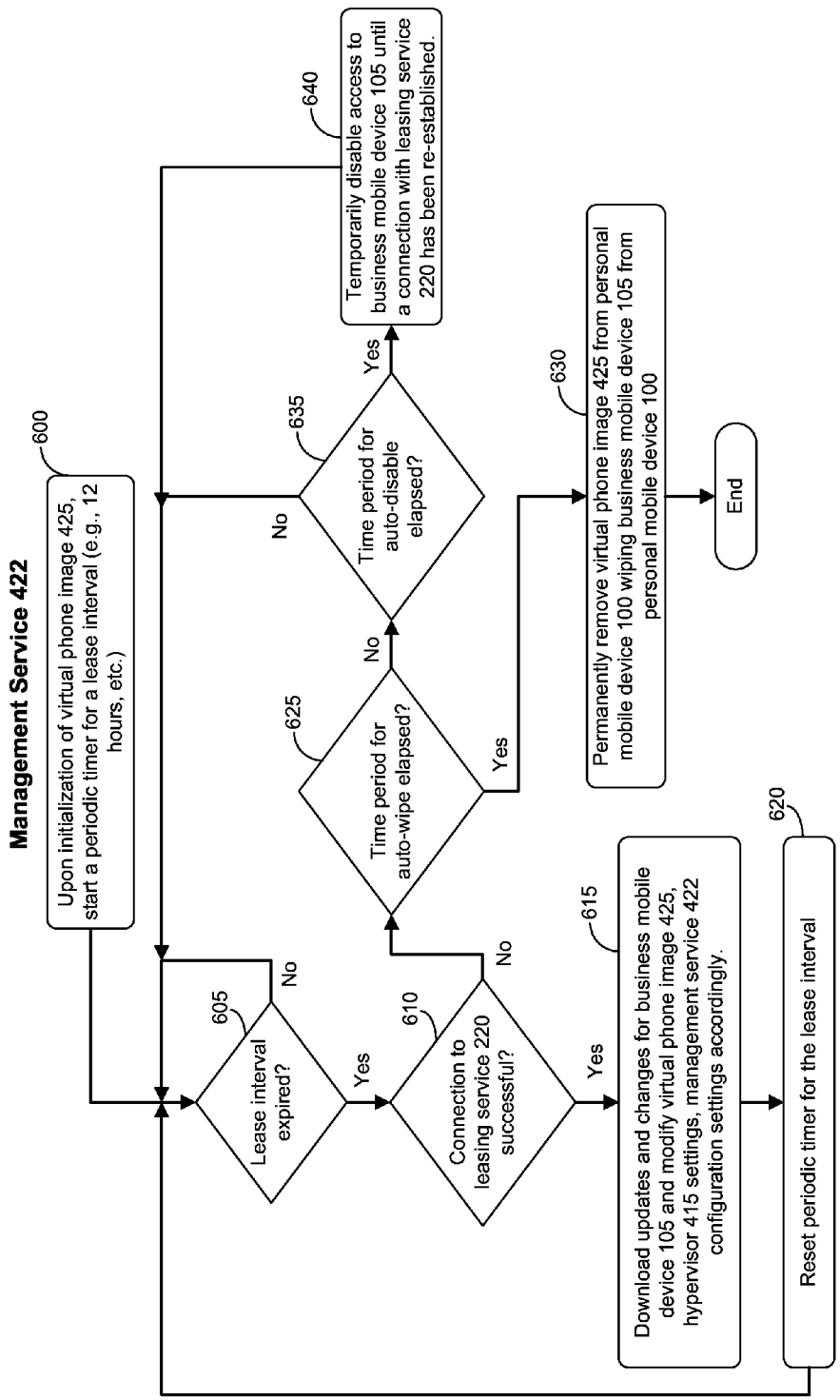
FIG. 6 is a flow that illustrates a process for establishing leasing communications between a mobile management platform server and a personal mobile device.

FIG. 6 is a flow that illustrates a process for establishing lease communications between a mobile management platform server 200 and a personal mobile device 100. As previously discussed, in certain embodiments, once virtual phone image 425 has been delivered, stored and installed, management service 422 of mobile application package 410 begins periodic "lease" communications with virtual phone leasing service 220 of mobile management platform 200. In certain embodiments, for security purposes, management service 422 runs in a privileged mode in the host OS of personal mobile device 100 such that management service 422 cannot be manually terminated by the user. In step 600, management service 422 initiates or starts a periodic timer for a lease interval, such as 12 hours (see, e.g., FIG. 3D). Upon expiration of the lease interval in step 605, management service 422 attempts to establish a connection with virtual phone leasing service 220. If, in step 610, a connection is successfully established, then in step 615, management service 422 communicates with virtual phone leasing service 220 and downloads any updates, changes and/or modifications to any settings for business mobile device 105 and modifies virtual phone image 425, hypervisor 415 settings (e.g., password security settings for business mobile device 105), management service 422 configuration settings (e.g., lease settings) and/or other settings and configurations accordingly. Such updates, changes, and/or modifications may include, for example, instructions to wipe business mobile device 105 from personal mobile device 100 (e.g., due to the user no longer being an employee at enterprise 115), new mobile applications to install on business mobile device 105, instructions to remove existing mobile applications from business mobile device 105, upgrades to the guest OS of business mobile device 105, changes to user settings and customizations for guest OS of business mobile device 105, changes to the group policy settings of the user, changes to shared preferences for mobile applications, and the like. In one embodiment, an administrator using mobile management platform server 200 may interact with user interface 205 to request any of the foregoing updates, changes and/or modifications to business mobile device 105, which are then queued until management service 422 successfully establishes a connection with virtual phone leasing service 220. After performing such updates, changes, and/or modifications by management service 422, in step 620, management service 422 resets its periodic timer and returns to step 605.

If, however, in step 610, a connection is not successfully established (e.g., due to a malicious user who has stolen personal mobile device 100 and turned off its wireless network capabilities), then in step 625, if a time period for an auto-wipe setting (e.g., 4 days in FIG. 3D) has elapsed, then in step 630, management service 422 will permanently delete or otherwise remove virtual phone image 425 from personal mobile device 100 thereby permanently wiping the existence of business mobile device 105 from personal mobile device 100 for security purposes. It should be recognized that the wiping of business mobile device 105 from personal mobile device 100 does not affect a user's ability to use personal mobile device 100. If, the time period for auto-wipe has not elapsed, then, in step 635, if a time period for an auto-disable setting (e.g., 1 day in FIG. 3D) has elapsed, then, in step 640, management service 422 will temporarily disable access by the user to business mobile device 105 until a connection with virtual phone leasing service has been re-established in step 610. It should be recognized that the flow of FIG. 6 for lease communications is merely exemplary and various alternatives may be made consistent with the teachings herein. For example, while FIG. 6 describes a "polling" technique in which management service 422 running on personal mobile device 100 initiates an attempt to establish communications with virtual phone leasing service 220 of mobile management platform 200, alternative embodiments may employ a push model, whereby virtual phone leasing service 220 utilizes a periodic timer to transmit push messages to management service 422 on personal mobile device 100 to request management service 422 to connect back to virtual phone leasing service 220.

Although one or more embodiments of the present invention have been described in some detail for clarity of understanding, it will be apparent that certain changes and modifications may be made within the scope of the claims. For example, while embodiments herein have referred to certain mobile operating systems such as Android, it should be recognized that any mobile operating systems may be utilizing in alternative embodiments such as Apple's iOS, Research in Motion's Blackberry OS, Microsoft's Windows Phone, Hewlett Packard's webOS, Symbian, Java, and the like. Similarly, while embodiments herein have generally utilized a smartphone as an example of a mobile device, it should be recognized that any potable device that has primary purposes of providing mobile computing or mobile data services to a user may utilize the techniques herein, including tablet computers and similar portable devices. It should further be recognized that use of certain terminology that may be more commonly used with certain operating systems than others is merely exemplary not meant to limit the scope of the teachings herein to any particular operating system and that corresponding functions and components in other operating system platforms may benefit from the teachings herein. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for providing a graphical user interface to provision business environments on mobile devices, the method comprising:
    presenting a navigation panel that displays a virtual phone template menu item and a policy setting menu item;
    upon selection of the virtual phone template menu item, presenting a template user interface in a display panel that enables an administrator to customize virtual phone image templates for users in an enterprise to be delivered to mobile devices that are configured to run the virtual phone image templates as virtual machines in order to provide a business environment, wherein each of the virtual phone image templates includes a mobile operating system, configuration information for the mobile operating system and a plurality of mobile applications installed in the mobile operating system; and
    upon selection of the policy setting menu item, presenting at least one lease option for the virtual phone image, wherein the at least one lease option indicates a lease interval for at least a respective one of the virtual phone image templates.

2. The method of claim 1, further comprising:
    upon selection of the policy setting menu item by the administrator, presenting a policy user interface in the display panel that enables the administrator to set security policies corresponding to the virtual phone image templates, wherein each of the security policies specifies a time interval within which a mobile device running a virtual machine corresponding to one of the virtual phone image templates should communicate with an enterprise server to comply with the security policy.

3. The method of claim 2, wherein the policy user interface displays a configurable setting for a virtual phone disable time interval for the at least one lease option, wherein upon expiration of the virtual phone disable time interval on a mobile device without an intervening communication with the enterprise server, the mobile device is configured to disable access to a virtual machine running on the mobile device.

4. The method of claim 2, wherein the policy user interface displays configurable settings for user authentication requirements to access a virtual machine running on a mobile device.

5. The method of claim 2, wherein the policy user interface displays a configurable setting for a virtual phone delete time interval for the at least one lease option, wherein upon expiration of the virtual phone delete time interval on a mobile device without an intervening communication with the enterprise server, the mobile device is configured to remove a virtual phone image template from the mobile device.

6. The method of claim 1, wherein the navigation panel further displays a groups menu item and the method further comprises, upon selection of the groups menu items, presenting a groups user interface in the display panel that enables the administrator to organize the users into business groups.

7. The method of claim 1, wherein the template user interface displays a panel that enables the administrator to add applications to a virtual phone image template.

8. The method of claim 1, wherein the navigation panel further displays a users menu item and the method further comprises, upon selection of the users menu items, presenting a user interface in the display panel that displays an activation status of a virtual phone template image for users in the enterprise.

9. A server configured to providing a graphical user interface to provision business environments on mobile devices, the server comprising a processor configured to perform the steps of:
    presenting a navigation panel that displays a virtual phone template menu item and a policy setting menu item;
    upon selection of the virtual phone template menu item, presenting a template user interface in a display panel that enables an administrator to customize virtual phone image templates for users in an enterprise to be delivered to mobile devices that are configured to run the virtual phone image templates as virtual machines in order to provide a business environment, wherein each of the virtual phone image templates includes a mobile operating system, configuration information for the mobile operating system and a plurality of mobile applications installed in the mobile operating system; and
    upon selection of the policy setting menu item, presenting at least one lease option for the virtual phone image, wherein the at least one lease option indicates a lease interval for at least a respective one of the virtual phone image templates.

10. The server of claim 9, wherein the navigation panel further displays a policy setting menu item, wherein the steps further comprise:

upon selection of the policy setting menu item by the administrator, presenting a policy user interface in the display panel that enables the administrator to set security policies corresponding to the virtual phone image templates, wherein each of the security policies specifies a time interval within which a mobile device running a virtual machine corresponding to one of the virtual phone image templates should communicate with an enterprise server to comply with the security policy.

11. The server of claim 10, wherein the policy user interface displays a configurable setting for a virtual phone disable time interval for the at least one lease option, wherein upon expiration of the virtual phone disable time interval on a mobile device without an intervening communication with the enterprise server, the mobile device is configured to disable access to a virtual machine running on the mobile device.

12. The server of claim 10, wherein the policy user interface displays configurable settings for user authentication requirements to access a virtual machine running on a mobile device.

13. The server of claim 10, wherein the policy user interface displays a configurable setting for a virtual phone delete time interval for the at least one lease option, wherein upon expiration of the virtual phone delete time interval on a mobile device without an intervening communication with the enterprise server, the mobile device is configured to remove a virtual phone image template from the mobile device.

14. The server of claim 9, wherein the navigation panel further displays a groups menu item and the processor is further configured to perform the step of, upon selection of the groups menu items, presenting a groups user interface in the display panel that enables the administrator to organize the users into business groups.

15. The server of claim 9, wherein the template user interface displays a panel that enables the administrator to add applications to a virtual phone image template.

16. The server of claim 9, wherein the navigation panel further displays a users menu item and the processor is further configured to perform the step of, upon selection of the users menu items, presenting a user interface in the display panel that displays an activation status of a virtual phone template image for users in the enterprise.

17. A non-transitory computer readable storage medium comprising instructions that cause a processor of a server to provide a graphical user interface to provision business environments on mobile devices by performing the steps of:

presenting a navigation panel that displays a virtual phone template menu item and a policy setting menu item and a policy setting menu item;

upon selection of the virtual phone template menu item, presenting a template user interface in a display panel that enables an administrator to customize virtual phone image templates for users in an enterprise to be delivered to mobile devices that are configured to run the virtual phone image templates as virtual machines in order to provide a business environment, wherein each of the virtual phone image templates includes a mobile operating system, configuration information for the mobile operating system and a plurality of mobile applications installed in the mobile operating system; and upon selection of the policy setting menu item, presenting at least one lease option for the virtual phone image, wherein the at least one lease option indicates a lease interval for at least a respective one of the virtual phone image templates.

18. The non-transitory computer readable storage medium of claim 17, wherein the navigation panel further displays a policy setting menu item, wherein the steps further comprise:

upon selection of the policy setting menu item by the administrator, presenting a policy user interface in the display panel that enables the administrator to set security policies corresponding to the virtual phone image templates, wherein each of the security policies specifies a time interval within which a mobile device running a virtual machine corresponding to one of the virtual phone image templates should communicate with an enterprise server to comply with the security policy.

19. The non-transitory computer readable storage medium of claim 18, wherein the policy user interface displays a configurable setting for a virtual phone disable time interval for the at least one lease option, wherein upon expiration of the virtual phone disable time interval on a mobile device without an intervening communication with the enterprise server, the mobile device is configured to disable access to a virtual machine running on the mobile device.

20. The non-transitory computer readable storage medium of claim 18, wherein the policy user interface displays configurable settings for user authentication requirements to access a virtual machine running on a mobile device.

* * * * *